US008914798B2

(12) United States Patent
Augusto et al.

(10) Patent No.: US 8,914,798 B2
(45) Date of Patent: Dec. 16, 2014

(54) PRODUCTION CONTROL FOR SERVICE LEVEL AGREEMENTS

(75) Inventors: Leonardo R. Augusto, Campinas (BR); Lucas G. Franco, Campinas (BR); Lucas Riberto De Lima, Campinas (BR); Thiago C. Rotta, Campinas (BR); Julio Cesar Casadio Telles, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 12/792,152

(22) Filed: Jun. 2, 2010

(65) Prior Publication Data

US 2010/0318859 A1    Dec. 16, 2010

(51) Int. Cl.
G06F 9/46      (2006.01)
G06F 11/07     (2006.01)

(52) U.S. Cl.
CPC ........ G06F 11/0766 (2013.01); G06F 11/0715 (2013.01); G06F 11/0748 (2013.01)
USPC .............. 718/101; 714/47.1; 714/48; 714/57; 714/751

(58) Field of Classification Search
None
See application file for complete search history.

(56) References Cited

U.S. PATENT DOCUMENTS

| | | | | |
|---|---|---|---|---|
| 5,748,884 A * | 5/1998 | Royce et al. ..................... 714/57 |
| 5,826,104 A * | 10/1998 | Rifkin ............................. 710/15 |
| 5,872,970 A * | 2/1999 | Pickett et al. ................. 718/101 |
| 5,893,905 A * | 4/1999 | Main et al. .................... 705/7.38 |
| 6,353,844 B1 * | 3/2002 | Bitar et al. ..................... 718/102 |
| 6,556,659 B1 | 4/2003 | Bowman-Amuah |
| 7,133,805 B1 * | 11/2006 | Dankenbring et al. ....... 702/186 |
| 7,219,266 B2 * | 5/2007 | Glerum et al. ............. 714/38.11 |
| 7,509,539 B1 * | 3/2009 | Denefleh et al. ................ 714/48 |
| 7,577,879 B2 * | 8/2009 | Lantz et al. ...................... 714/57 |
| 8,266,622 B2 * | 9/2012 | Cardelli ......................... 718/102 |
| 2004/0025092 A1 * | 2/2004 | Babutzka et al. ............... 714/48 |
| 2004/0135805 A1 * | 7/2004 | Gottsacker et al. ........... 345/751 |
| 2004/0237087 A1 * | 11/2004 | Ye et al. ........................ 718/101 |
| 2005/0005271 A1 | 1/2005 | Clymer et al. |
| 2005/0060401 A1 * | 3/2005 | Brown .......................... 709/224 |
| 2005/0081118 A1 * | 4/2005 | Cheston et al. ................. 714/47 |
| 2005/0131937 A1 | 6/2005 | Parkyn |
| 2006/0149576 A1 * | 7/2006 | Ernest et al. ....................... 705/1 |
| 2007/0220516 A1 * | 9/2007 | Ishiguro et al. ............... 718/101 |
| 2008/0177698 A1 | 7/2008 | Agarwal et al. |
| 2009/0013208 A1 * | 1/2009 | DiMuzio ........................... 714/2 |

* cited by examiner

Primary Examiner — Emerson Puente
Assistant Examiner — Hiren Patel
(74) Attorney, Agent, or Firm — Andrea Bauer; Hoffman Warnick LLC

(57) ABSTRACT

The illustrative embodiments described herein provide a computer implemented method, apparatus, and computer program product for managing a batch production system. In an illustrative embodiment, an application forecast is generated for a set of batch jobs in a critical path of a batch application. The application forecast comprises a sum of execution times for the batch jobs in the critical path. In response to detecting an abend from production data generated during the execution of the batch application, the abend is mapped against known abends in an abend database to identify a set of abend solutions. Thereafter, a notification is generated which comprises at least one of a status of the batch application and the set of abend solutions, wherein the status is generated based on the application forecast.

17 Claims, 5 Drawing Sheets

PRODUCTION CONTROL FOR SERVICE LEVEL AGREEMENTS

CROSS-REFERENCE TO RELATED APPLICATIONS

This application claims the benefit of Canadian Patent Application No. 2668958, filed Jun. 12, 2009, which is incorporated herein by reference.

FIELD OF THE INVENTION

The present invention relates generally to an improved data processing system and in particular to a method and apparatus for managing batch production environments. Still more particularly, the present invention relates to a computer implemented method, apparatus, and computer program product for resolving abnormal endings of batch jobs and providing real-time monitoring of critical path jobs.

RELATED ART

Outsourcing is a method by which a client contracts with a third party service provider for predetermined services or to perform a particular function. For example, an application service provider is a third party that provides clients with access to a particular software application. The decision to outsource is often made by a client for the purpose of lowering costs or making better use of time or resources. The terms of the agreement between the client and service provider is governed by a service level agreement. In particular, the service level agreement specifies thresholds and other quality metrics that dictate the performance level of the outsourced service. Additionally, the service level agreement may indicate fines and penalties for any infringement of the terms of the service level agreement by the client or service provider.

Business segments typically outsourced include, without limitation, information technology, human resources, facilities, real estate management, and accounting. Many companies also outsource customer support and call center functions like telemarketing, CAD drafting, customer service, market research, manufacturing, designing, web development, content writing, ghostwriting and engineering. One common type of outsourced service includes production environments. A production environment is an operating environment that includes systems, applications, jobs, and equipment supporting live business operations. A specific type of production environment is a batch production environment.

A batch production environment is a production environment in which batch applications are executed. The building blocks of the batch applications of a batch production system are batch jobs that are often executed in a particular sequence and within a predefined batch execution window. In many instances, the batch jobs need to be completed by a certain time and date in order to feed other processes and/or provide other business groups with relevant information. Delays in the completion of one or more batch jobs may ultimately delay the completion of batch applications in violation of existing service level agreements. One type of event that commonly delays the completion of batch jobs is an "abend." An abend is an abnormal ending of a software application. An abend is sometimes also colloquially referred to as a software crash.

SUMMARY OF THE INVENTION

The illustrative embodiments described herein provide a computer implemented method, apparatus, and computer program product for managing a batch production system. In an illustrative embodiment, an application forecast is generated for a set of batch jobs in a critical path of a batch application. The application forecast comprises a sum of execution times for the batch jobs in the critical path. In response to detecting an abend from production data generated during the execution of the batch application, the abend is mapped against known abends in an abend database to identify a set of abend solutions. Thereafter, a notification is generated which comprises at least one of a status of the batch application and the set of abend solutions, wherein the status is generated based on the application forecast.

DETAILED DESCRIPTION OF THE INVENTION

Figure 1:
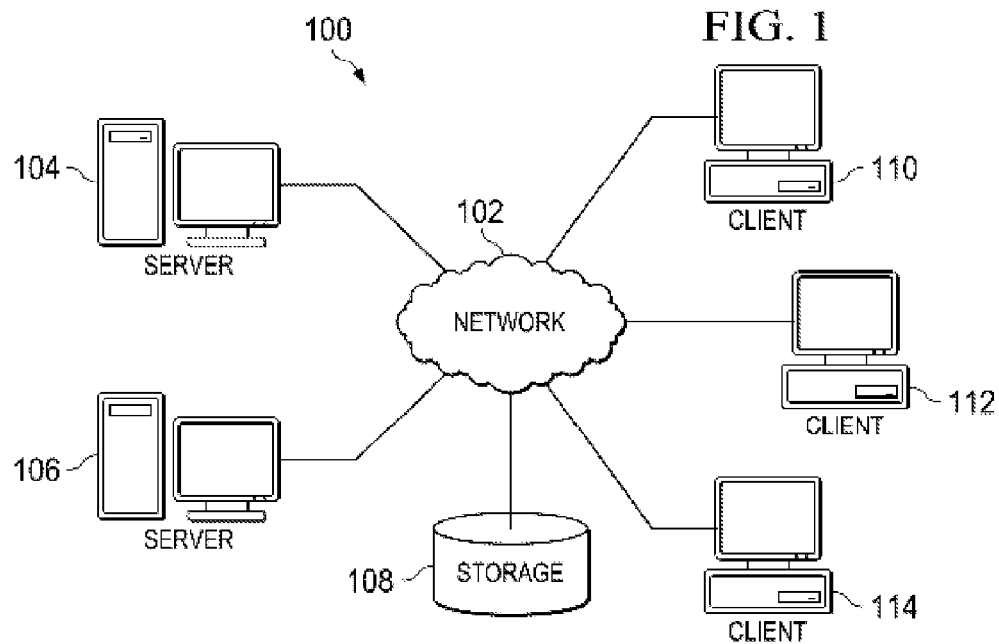
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
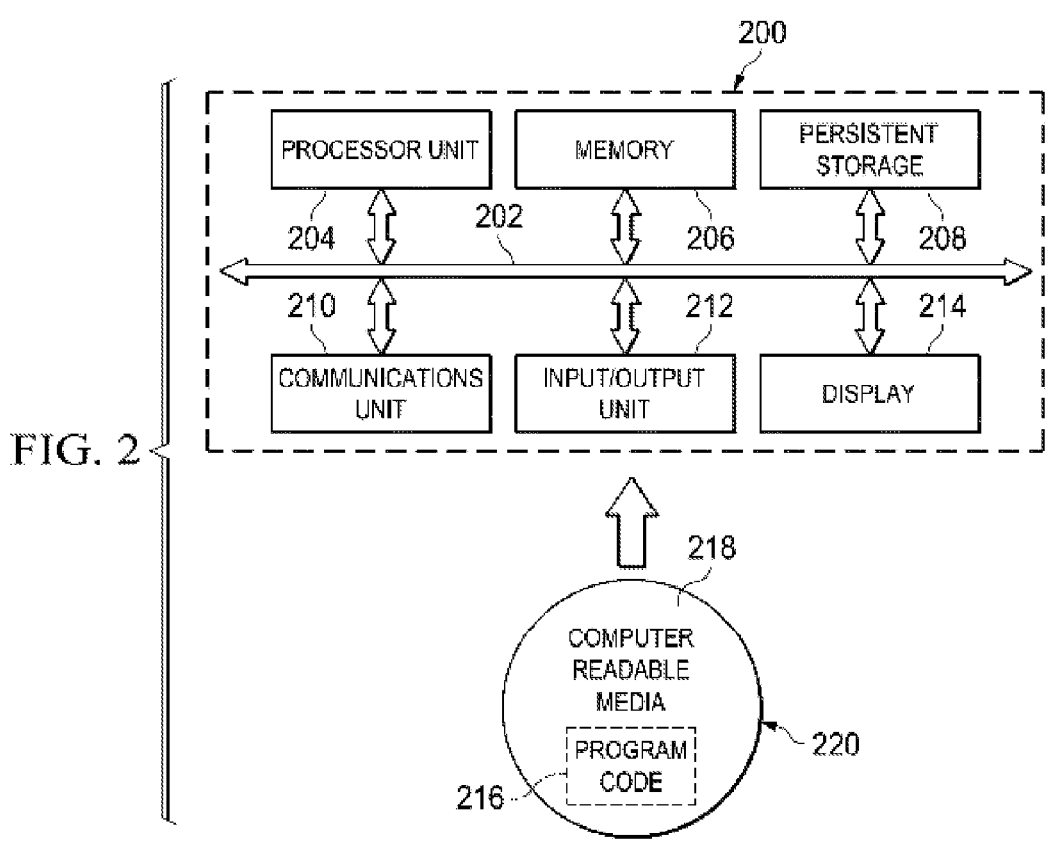
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In an illustrative example, a production server, such as server 104, may host one or more software modules for use in managing a batch production system governed by a pre-defined service level agreement. A first software module may import client data generated on a client computing device, such as client 110. The client data may then be fed into a database maintained in a storage device, such as storage 108. The client data may then be used by other software modules for monitoring batch production data generated by the batch production system. For example, alerts or other notifications may be generated for facilitating the resolution of abnormal endings (abends) and for identifying the real-time status of batch jobs or batch applications. The notifications may be presented to a user via a dashboard that displays up-to-date information that may be used for achieving service level agreement deadlines.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Customer production environments may include a set of batch applications for satisfying a service level agreement between a client and service provider. As used herein, the term "set" refers to one or more, unless specifically defined otherwise. Thus, a set of batch applications is one or more batch applications. Further, each batch application in the set of batch applications may include a set of batch jobs which must be completed within predefined batch execution windows. The failure to complete execution of critical path jobs during their respective batch execution windows may delay the completion of the entire project and infringe a controlling service level agreement. A critical path is the schedule of processes or jobs identified by a client, and whose cumulative time requirements determine the minimum total project time. Thus, delays in batch jobs in the critical path of the batch application may delay completion of the batch application.

Currently used solutions for managing batch production systems generally provide for a set of shell scripts that analyze an execution log of a batch application and periodically send reports to a system administrator. These currently used solutions usually require the system administrator or other recipient to begin the tedious task of manually resolving errors indicated in the provided reports. The manual resolution of errors is time consuming, inefficient, and requires continual oversight. In addition, reports may not be timely generated, thus remedial actions may not be taken until the terms of a service level agreement have already been violated.

The illustrative embodiments disclosed herein provide a framework to control the execution of multiple distributed batch production applications for providing customers with an increased and reliable quality of service. The framework is capable of detecting the abends and suggesting possible solutions for identified errors. In addition, the framework includes a method for learning how to resolve new errors automatically. Further, the illustrative embodiments provide an interface for allowing an administrator to track the real-time status of all running applications. For example, the interface may indicate which applications have infringed their service level agreement, which applications are likely to infringe their service level agreement, and which applications are not likely to infringe their service level agreement.

The framework provides for a lighthouse analysis process capable of real-time monitoring of batch jobs and/or applications in a customer's critical path. To prevent such delays, the lighthouse analysis process may generate alarms and/or other forms of notifications when delays in the critical path are detected. The lighthouse analysis process may also generate reports of the achieved percentage of a service level agreement. The reports may indicate whether a batch execution window has been missed or whether other terms of a service level agreement have been infringed. In addition, the lighthouse analysis process may also measure actual execution times of active applications and forecasted execution times and determine if a service level agreement is at risk for infringement.

The framework disclosed herein also provides for an abend analysis process. The abend analysis process complements the lighthouse analysis process by identifying the batch jobs and/or applications which have experienced abends. In addition, the abend analysis process provides relevant data, such as the rate at which a particular job encounters an error, batch systems and applications affected, and error return codes.

The abend analysis process also maintains a comprehensive database of known abend errors and associated solutions. Consequently, administrators can quickly and easily remedy abends that have been previously encountered. In one embodiment, solutions may be automatically selected and then sent to a production environment for implementation when a selected abend is detected. In addition, the abend analysis process also provides a method for learning new solutions for abends that are encountered for the first time. Corresponding solutions may also be stored for resolving future abends.

Therefore, in one embodiment of the present invention, a computer implemented method, apparatus, and computer program product is provided for controlling a batch production system. In an illustrative embodiment, an application forecast is generated for a set of batch jobs in a critical path of a batch application. The application forecast comprises a sum of execution times for the batch jobs in the critical path. In response to detecting an abend from production data generated during the execution of the batch application, the abend is mapped against known abends in an abend database to identify a set of abend solutions. Thereafter, a notification is generated which comprises at least one of a status of the batch application and the set of abend solutions, wherein the status is generated based on the application forecast.

As used herein, the term "at least one of", when used with a list of items means that different combinations of one or more of the items may be used and only one of each item in the list may be needed. For example, "at least one of item A, item B, and item C" may include, for example and without limitation, item A or item A and item B. This example also may include item A, item B, and item C or item B and item C. Thus, in one example, a notification that comprises at least one of a status of the batch application and the set of abend solutions means the notification comprises either the status of the batch application, or the set of abend solutions, or both.

Figure 3:
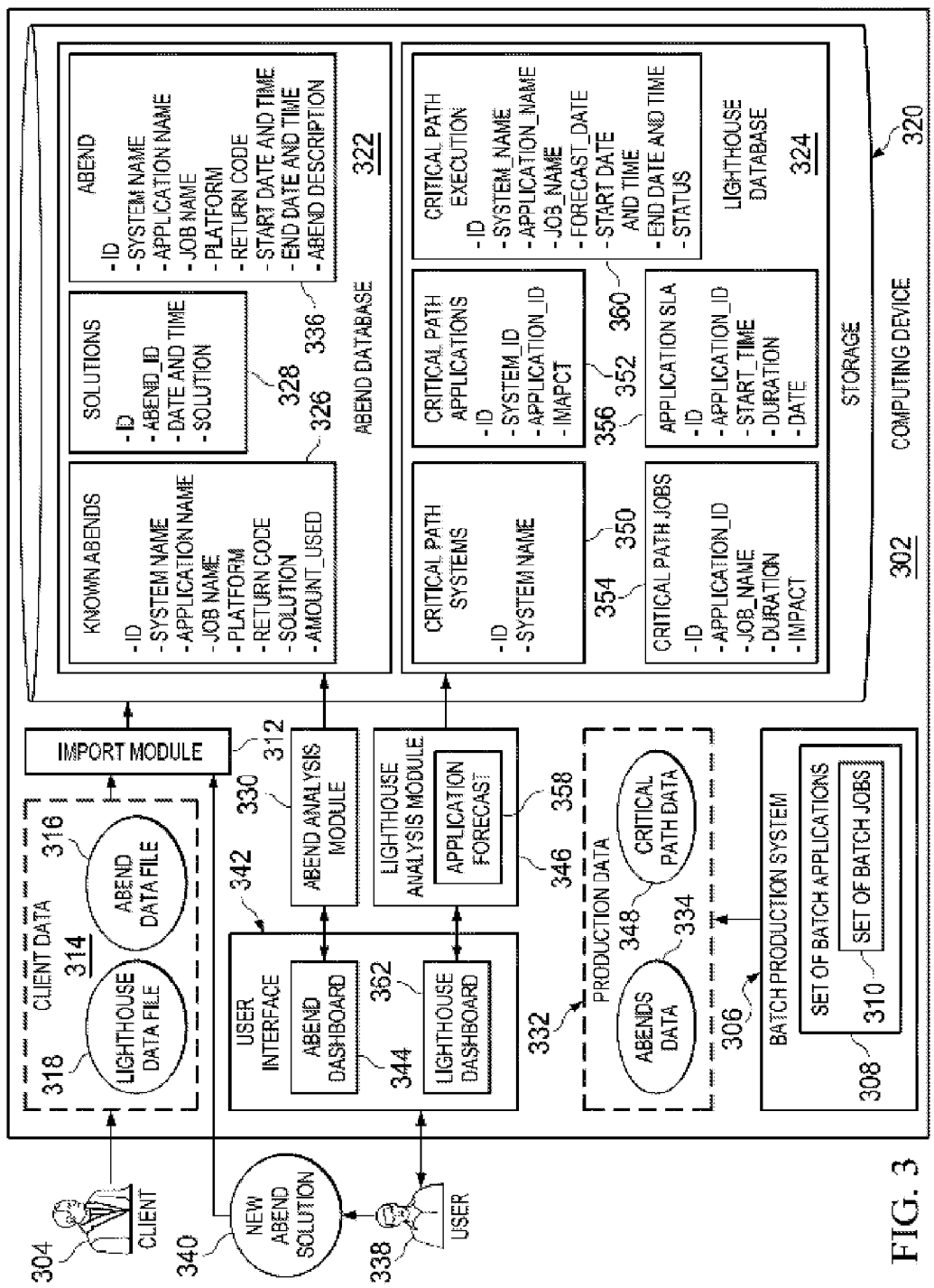
FIG. 3 is a block diagram of a data processing system for managing a batch production system in accordance with an illustrative embodiment.

FIG. 3 is a block diagram of a data processing system for managing a batch production system in accordance with an illustrative embodiment. The data processing system is a data processing system, such as, but without limitation, data processing system 100 in FIG. 1. For example, computing device 302 may be a computing device such as server 104 in FIG. 1. In addition, client 304 is a customer seeking outsourced services from a third party service provider. Client 304 may communicate data to computing device 302 via a computing device, such as, for example but without limitation, client 110 in FIG. 1.

In this illustrative embodiment in FIG. 3, computing device 302 includes batch production system 306. Batch production system 306 is one or more systems or logical partitions in which set of batch applications 308 are hosted. Set of batch applications 308 is one or more batch applications for performing batch operations. Set of batch applications 308 includes set of batch jobs 310. Set of batch jobs 310 is one or more scheduled tasks or processes performed in a batch processing environment.

The management of batch production system 306 in this example, but without limitation, involves three processes, each of which are performed by separate software modules. In alternate embodiments, the three processes may be performed by one or more software modules. The first process involves importing data from a client for use in managing set of batch applications 308. The second process involves performing an abend analysis to detect and resolve abends arising during the execution of set of batch applications 308. The third process involves performing a lighthouse analysis for gathering multi-grained status information and generating associated reports, alerts, or other forms of notifications. The notifications may then be used for identifying problems during the execution of set of batch applications 308.

The importing of data from a client is performed by import module 312. Import module 312 is a software program for importing data from client 304 for managing outsourced services. Specifically, import module 312 imports client data 314 from client 304 for managing set of batch applications 308. Client data 314 is data generated by a customer, such as client 304, during the customer's execution of batch applications from set of batch applications 308. The data generated by client 304 on the customer side is collected, formatted, and transmitted as client data 314 to a production environment. Client data 314 may then be used for resolving problems encountered during the execution of set of batch applications 308 in a production environment.

In this example, but without limitation, one type of data included within client data 314 is abend data file 316. Abend data file 316 is a file populated with data relating to the abends detected during the execution of batch applications on the customer side by client 304. Abend data file 316 may include, for example, the log generated by a scheduler tool controlling the execution of batch jobs within each batch application. Additionally, types of information included within abend data file 316 may include, without limitation, a job name, a system name, an application name, an execution start time, an abend end time, and a return code associated with the error.

Another type of data that may be included within client data 314 is lighthouse data file 318. Lighthouse data file 318 is a file populated with data relating to the identification of critical paths for each batch application in set of batch applications 308. Client 304 may identify in lighthouse data file 318 the critical path of each batch application. In addition, lighthouse data file 318 may include execution logs for the batch jobs in the critical paths. The data stored in lighthouse data file 318 may be used to calculate a baseline time for completing each batch job or batch application in set of batch applications 308.

Import module 312 is responsible for importing client data 314 into a batch production environment for use in managing set of batch applications 308. The process of importing client data involves ensuring that client data 314 has been properly formatted. To this end, import module 312 analyzes the layout of client data 314. If the layout is incorrect, then import module 312 generates an error and terminates the importing process without importing client data 314. If import module determines that client data 314 is properly formatted, then import module 312 imports client data 314 into data structures maintained within storage 320.

In one example, storage 320 is a storage device such as storage device 108 in FIG. 1. In other non-limiting examples, storage 320 may be a portable computer diskette, a hard disk, a random access memory (RAM), a read-only memory (ROM), an erasable programmable read-only memory (EPROM or Flash memory), a portable compact disc read-only memory (CDROM), or an optical storage device. Storage 320 includes abend database 322 and lighthouse database 324. Abend database 322 is a data structure for storing data related to the identification and resolution of abends encountered during the execution of set of batch applications 308. Similarly, lighthouse database 324 is a data structure for storing data related to the monitoring of critical path batch jobs from set of batch applications 308. Client data 314 is imported into at least one of abend database 322 and lighthouse database 324 by import module 312. Specifically, data derived from abend data file 316 is imported into abend database 322. Data derived from lighthouse data file 318 is imported into lighthouse database 324.

An example of a type of record that may be maintained in abend database 322 is known abends 326. Known abends 326 is a set of records that includes data relating to previously encountered abends. The previously encountered abends may be identified by a customer and included in abend data file 316 that is imported into abend database 322 by import module 312. Fields present in known abends 326 may include, without limitation, an abend identifier, a system name, application name, job name, platform identifier, return code, solution, and an amount that a particular abend is used. The fields of known abends 326 may be used to identify abends detected during the execution of set of batch applications 308. The fields shown in FIG. 3 are non-limiting examples of fields that may be optionally used. In other embodiments, additional fields not described in FIG. 3 may be implemented in addition to these fields. Likewise, other embodiments may be implemented using fewer fields than are described in FIG. 3.

Another type of record that may be maintained in abend database 322 is solutions 328. Solutions 328 are a set of records that associates an abend with one or more solutions for resolving that abend. Solutions 328 may include such fields as, for example, solution identifier, abend id, date and time, and solution. Thus, the solution field of known abends 326 may store a pointer identifying the value stored in the solution identifier field in solutions 328. In this manner, when a detected abend is determined to be a known abend, then a solution for the abend can be quickly and easily located and implemented.

Abend analysis module 330 is a software module for detecting and resolving abends. In one embodiment, abend analysis module 330 detects the abends by monitoring production data 332 for data indicating the occurrence of abends. Production data 332 is the data generated during the execution of set of batch applications 308. Production data 332 may include abends data 334. Abends data 334 is data describing or otherwise related to the occurrence of abends. If abend analysis module 330 detects the presence of abends data 334, and thus detects the occurrence of an abend, then abend analysis module 330 may extract from abends data 334 relevant information for generating abend 336. Abend 336 is data describing an abend detected by abend analysis module 330. In one embodiment, abend 336 may be initially stored in a temporary memory location and subsequently deleted after resolution if abend analysis module 330 identifies abend 336 as a known abend. However, if abend 336 is a new abend that does not correspond with a record in known abend 336, then import module 312 may import abend 336 into abend database 322 from the temporary memory location.

Examples of fields that may be present in abend 336 includes, for example, abend id, system name, application name, job name, platform, return code, start date and time, end date and time, and abend description. More fields or fewer fields may be included in abend 336 depending upon the particular embodiment implemented. Abend analysis module 330 may compare the information within the fields of abend 336 with the fields from records of known abends 326 to determine if abend 336 describes a known abend. If abend analysis module 330 is able to determine that abend 336 describes a known abend, then abend analysis module 330 may identify one or more solutions from solutions 328 for resolving the abend.

In some instances, existing solutions for known abends may be applied to newly encountered abends. The decision to apply existing solutions for newly encountered abends may be made by user 338 based on any number of relevant criteria, such as a similarity of causes or solutions when compared to known abends. In some instances, however, a new solution would be required to resolve the new abend. If abend 336 is a new abend without an existing solution, then abend analysis module 330 may prompt user 338 for a new solution. User 338 is an administrator tasked with managing batch production system 306. The new solution provided by user 338 is new abend solution 340. New abend solution 340 is a solution for resolving an abend, such as abend 336, which did not previously exist in solutions 328. Import module 312 may then import new abend solution 340 into solutions 328 for subsequent application if abend 336 is encountered again in the future.

Abend analysis module 330 interfaces with user 338 via user interface 342. User interface 342 is an interface for presenting user 338 with information for managing batch production system 306. For example, user 338 may receive status information about the executing batch jobs, or other forms of notifications on user interface 342. In addition, user 338 may be presented with a notification indicating the existence of an abend, and with proposed solutions, if they exist. User 338 may also generate new abend solution 340 at user interface 342 for resolving unknown abends. Thus, user interface 342 may include hardware and/or software components, such as, for example, display devices, I/O devices, graphical user interfaces, web user interfaces, command line interfaces, batch interfaces, browsers, or any other existing or later developed type of user interface. In this illustrative embodiment in FIG. 3, user interface 342 presents information to user 338 in a set of dashboards.

Abend dashboard 344 is a display area of user interface 342 which displays to user 338 notifications about abends occurring during the execution set of batch applications 308. In addition, abend dashboard 344 may display a list of proposed solutions that user 338 may implement in order to resolve the detected abend.

Lighthouse analysis module 346 is a software component for performing a lighthouse analysis process on batch jobs and applications in a client-specified critical path. The lighthouse analysis process includes the gathering of multi-grained status information and generating of associated reports, alerts, or other forms of notifications. The multi-grained status information is derived from critical path data 348, which lighthouse analysis module 346 detects in production data 332. Critical path data 348 is data originating from or otherwise related to the execution of the critical path batch jobs from set of batch jobs 310 in a critical path as identified by client 304.

Lighthouse analysis module 346 may reference lighthouse database 324 for identifying and monitoring a batch application's critical path. Lighthouse database 324 is a data structure storing data derived, at least in part, by the information provided by client 304 in lighthouse data file 318. For example, a customer, such as client 304, may identify the critical path systems, applications, and jobs in a batch production system, such as batch production system 306. In addition, the customer may indentify related service level agreements that govern the execution of the applications. That data may be specified in lighthouse data file 318 and imported into lighthouse database 324 by import module 312. In this illustrative example in FIG. 3, the data used by lighthouse analysis module 346 for monitoring a batch application's critical path includes critical path systems 350, critical path applications 352, critical path jobs 354, and application service level agreements (SLA) 356.

Critical path systems 350 is a record having fields for identifying systems in a customer-identified critical path. Fields in critical path systems 350 may include an identifier and a system name. Critical path applications 352 is a record having fields for identifying the applications in the critical path. Fields in critical path applications 352 may include an identifier, system identification, application name, and impact. Critical path jobs 354 is a record having fields for identifying the jobs in a critical path, and may include fields such as an identifier, application identification, job name, duration, and impact. Application SLA 356 is a record having fields for associating a service level agreement with an application referenced in critical path applications 352. Fields of application SLA 356 may include an identifier, application identification, start time, duration, and date. Using these records, jobs can be associated with applications and applications can be associated with systems. Furthermore, application service level agreements can be associated with particular applications.

Lighthouse analysis module 346 may use the data stored in lighthouse database 324 to generate application forecast 358. Application forecast 358 is a data model presenting data related to the execution of critical path batch jobs and/or applications. For example, application forecast 358 may include statistics calculated by lighthouse analysis module 346 which relate to application executions within predefined time periods. The statistics may include, for example, an indication of the frequency at which certain applications are delayed, the extent of a delay based upon events during execution, and average execution times. Lighthouse analysis module 346 may then present application forecast 358 to user 338 for managing the operation of batch production system 306. With reference to application forecast 358, lighthouse analysis module 346 may notify user 338 of the batch jobs and applications which are delayed, which are on time, and which have already infringed its service level agreement.

In one illustrative example, lighthouse analysis module 346 determines the average execution time for each batch job in a client-specified critical path. The average execution time may be calculated by lighthouse analysis module 346 by monitoring the execution of batch jobs over time, or may be provided by an individual, such as user 338 or client 304. Lighthouse analysis module 346 may then determine which batch jobs from a critical path have already finished executing, and which batch jobs are incomplete. Lighthouse analysis module 346 may sum the actual execution times for the completed batch jobs in a batch application's critical path and the average execution times for the incomplete batch jobs. The summed execution times may be compared with time durations and deadlines provided for in a controlling service level agreement. Subsequently, lighthouse analysis module 346 can flag batch applications with status descriptors depending upon the amount of time that is needed to complete the batch jobs in the critical path.

For example, lighthouse analysis module 346 may flag a batch application with an "SLA on time" descriptor if the average execution times for the completing all unexecuted batch jobs in the critical path enables the batch application to complete within the acceptable duration value specified in application SLA 356. Similarly, if lighthouse analysis module 346 determines that the average execution times needed to complete all unexecuted batch jobs in a batch application's critical path do not allow the batch application to complete within the time duration specified in application SLA 356, then lighthouse analysis module 346 may flag the batch application with an "SLA missed" descriptor.

An analyst, such as user 338, may specify a variable threshold for determining whether an executing batch application should be flagged with an "SLA at risk" descriptor. For example, the user may set a 10% threshold for the time duration specified in application SLA 356. If lighthouse analysis module 346 determines that the sum of actual execution times and average execution times for completing the batch jobs in a batch application's critical path is within the 10% of the time duration specified in application SLA 356, then the batch application is flagged with an "SLA at risk" descriptor. Otherwise, lighthouse analysis module 346 may flag the batch application with an "SLA on time" descriptor or "SLA missed" descriptor if the sum of execution times is below the 10% time duration, or above the 10% time duration, respectively.

Application forecast 358 is generated in accordance with critical path execution 360. Critical path execution 360 is a set of instructions usable by lighthouse analysis module 346 for identifying the types of information to use in generating application forecast 358 during the execution of set of batch applications 308. For example, critical path execution 360 may specify a date on which application forecast 358 is to be created, and the types of information to include therein. In this illustrative embodiment in FIG. 3, critical path execution 360 requests application forecast 358 to include information such as, for example, system name, application name, job name, occurrence date, start date and time, and end date and time.

User 338 may be presented with application forecast 358 for managing batch production system 306. For example, user 338 may be provided with a notification indicating that a batch application started at a known date and time will have a projected end date and time that may potentially infringe its associated service level agreement. In particular, user 338 would be provided with a notification identifying the batch application with the "SLA at risk" descriptor. This notification may be presented to user 338 on lighthouse dashboard 362. Lighthouse dashboard 362 is also a display area of user interface 342. Lighthouse dashboard 362 displays multi-grained status information of the batch jobs and applications that are executing. The status information may enable user 338 to quickly and easily identify which applications are executing on time, which applications are running behind schedule, and which applications have already infringed a service level agreement.

Figure 4:
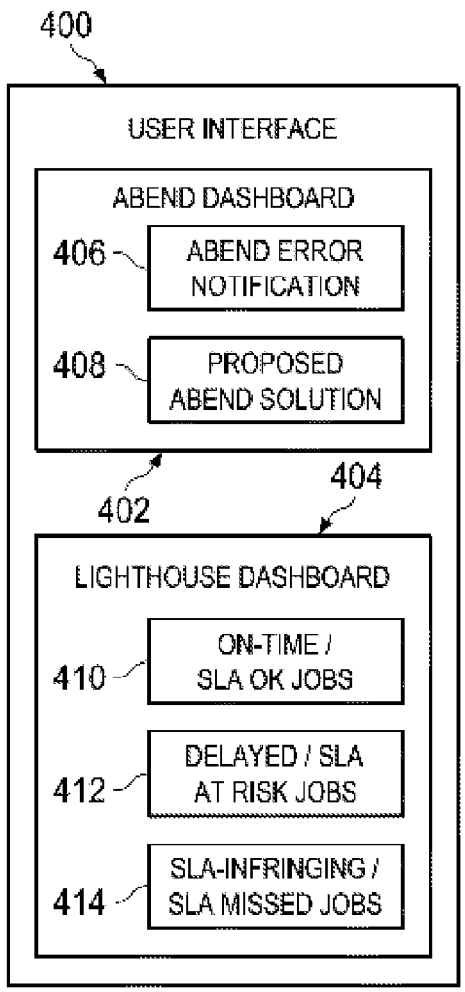
FIG. 4 is a block diagram of a user interface displaying dashboards in accordance with an illustrative embodiment.

FIG. 4 is a block diagram of a user interface for managing a batch production system in accordance with an illustrative embodiment. User interface 400 is a user interface such as user interface 342 in FIG. 3. User interface 400 includes, without limitation, abend dashboard 402 and lighthouse dashboard 404, which are dashboards such as abend dashboard 344 and lighthouse dashboard 362 in FIG. 3, respectively.

Information that may be presented in abend dashboard 402 may include abend error notification 406. Abend error notification 406 is a message notifying a user of the existence of an abend encountered during the execution of a batch application. Abend error notification 406 may indicate, for example, but without limitation, an abend identifier, return code, and the name of the system, application, and/or job name associated with the abend. In addition, abend error notification 406 may also indicate a start date and time, and an end date and time of a detected abend. In other embodiments, abend error notification 406 may be customized by a user to present more or less information.

Abend dashboard 402 may also provide to a user proposed abend solution 408. In an illustrative example, proposed abend solution 408 is one or more recommended solutions for resolving the abend identified by abend error notification 406. When an abend is detected, an abend analysis module, such as abend analysis module 330 in FIG. 3, maps the abend, then searches an abend database for recommended solutions for resolving the abend. In one embodiment, the abend analysis module implements a decision tree to determine which abend solutions best match the error conditions of the detected abend. Proposed abend solution 408 may also include a list of possible solutions which may be ordered based upon a best fit of the abend error conditions.

User interface 400 may also include lighthouse dashboard 404. Lighthouse dashboard 404 presents information relating to the status of executing batch jobs in a batch application. In particular, lighthouse dashboard 404 may present status information of each batch job. For example, one type of status information presented on lighthouse dashboard 404 may include on time/SLA ok jobs 410. On time/SLA ok jobs 410 is a listing of batch jobs and/or batch applications that are executing in accordance with the baseline execution time as set forth in an application forecast, such as application forecast 358 in FIG. 3. Lighthouse dashboard 404 may also present delayed/SLA at risk jobs 412. Delayed/SLA at risk jobs 412 is a listing of batch jobs and/or batch applications that are running behind schedule with reference to the baseline execution time as set forth in client-generated execution logs. Finally, lighthouse dashboard 404 may also present SLA-infringing/SLA missed jobs 414. SLA-infringing/SLA missed jobs 414 is a list of batch jobs and/or batch applications which have already missed the SLA execution window.

In other embodiments, each batch job and/or batch application listed on lighthouse dashboard 404 may be associated with a particular color based upon the execution status of the batch job or batch application. For example, batch applications that are running on-time may be presented in green text. Similarly, batch applications that are running behind schedule and may infringe an SLA execution time may be presented in yellow text. Batch applications that have infringed an SLA execution time may be presented in red text.

Figure 5:
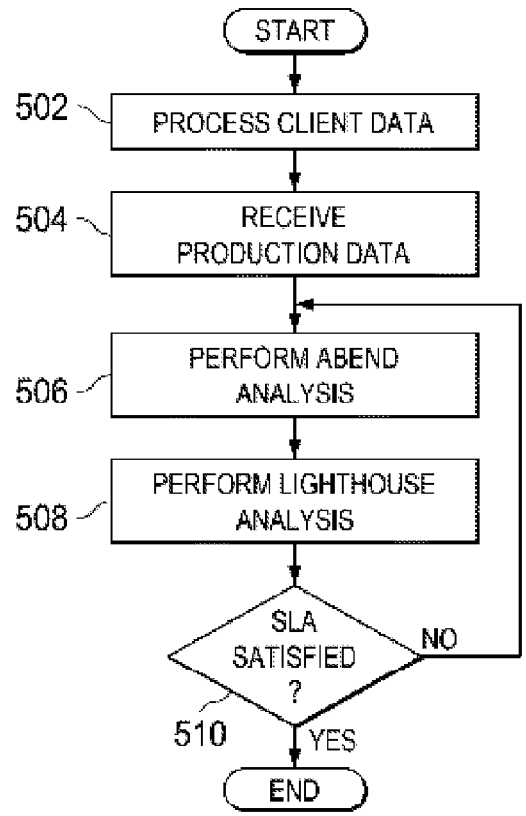
FIG. 5 is a flowchart of a high-level process for managing a batch production system in accordance with an illustrative embodiment.

FIG. 5 is a flowchart of a high-level process for managing a batch production system in accordance with an illustrative embodiment. The process may be implemented in software components of a computing device, such as computing device 302 in FIG. 3. In particular, steps 502 and 504 may be performed by an import module, such as import module 312 in FIG. 3. Step 506 may be performed by an abend analysis module, such as abend analysis module 330 in FIG. 3. Steps 508 and 510 may be performed by a lighthouse analysis module, such as lighthouse analysis module 346 in FIG. 3.

Client data is processed (step 502). The client data is client data such as client data 314 in FIG. 3. In addition, production data is received (step 504). The production data is production data such as production data 332 in FIG. 3. The production data is data generated from the execution of a batch production system and may include, without limitation, abend data and critical path data. The production data may be fed into at least one of an abend database or a lighthouse database for use in managing a batch production environment.

The process then performs an abend analysis (step 506). Additional details of the abend analysis are provided in FIG. 7. The process also performs a lighthouse analysis (step 508). Details of the lighthouse analysis are provided in FIG. 8. Thereafter, the process makes the determination as to whether the associated service level agreement (SLA) has been satisfied (step 510).

If the process makes the determination that the associated service level agreement (SLA) has not been satisfied, then the process returns to step 506. However, if the process makes the determination that the associated service level agreement (SLA) has been satisfied, then the process terminates.

Figure 6:
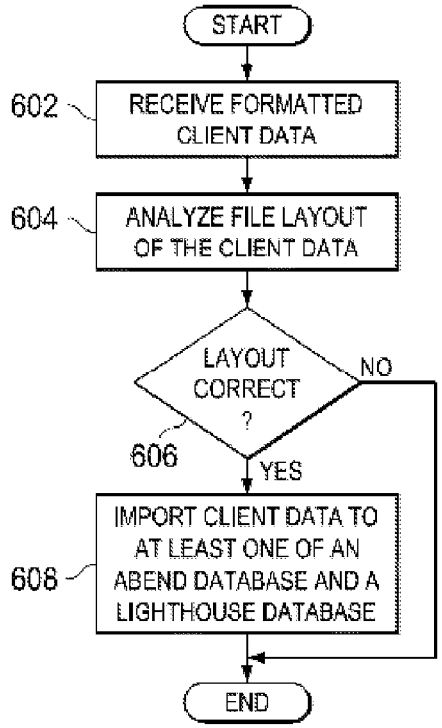
FIG. 6 is a flowchart of a process for importing client data in accordance with an illustrative embodiment.

FIG. 6 is a flowchart of a process for importing client data in accordance with an illustrative embodiment. The process may be implemented by a software component, such as import module 312 in FIG. 3.

The process begins by receiving client data (step 602). The client data is client data such as client data 314 in FIG. 3. The client data may include, for example and without limitation, abend data files and lighthouse data files. The process then analyzes the file layout of the client data (step 604). Thereafter, the process makes the determination if the layout is correct (step 606).

If the import process makes the determination that the layout of the client data is correct, then the process imports the client data to at least one of an abend database or a lighthouse database (step 608) and then terminates. However, if the import process makes the determination that the layout of the client data is not correct, then the import process terminates without importing the client data.

Figure 7:
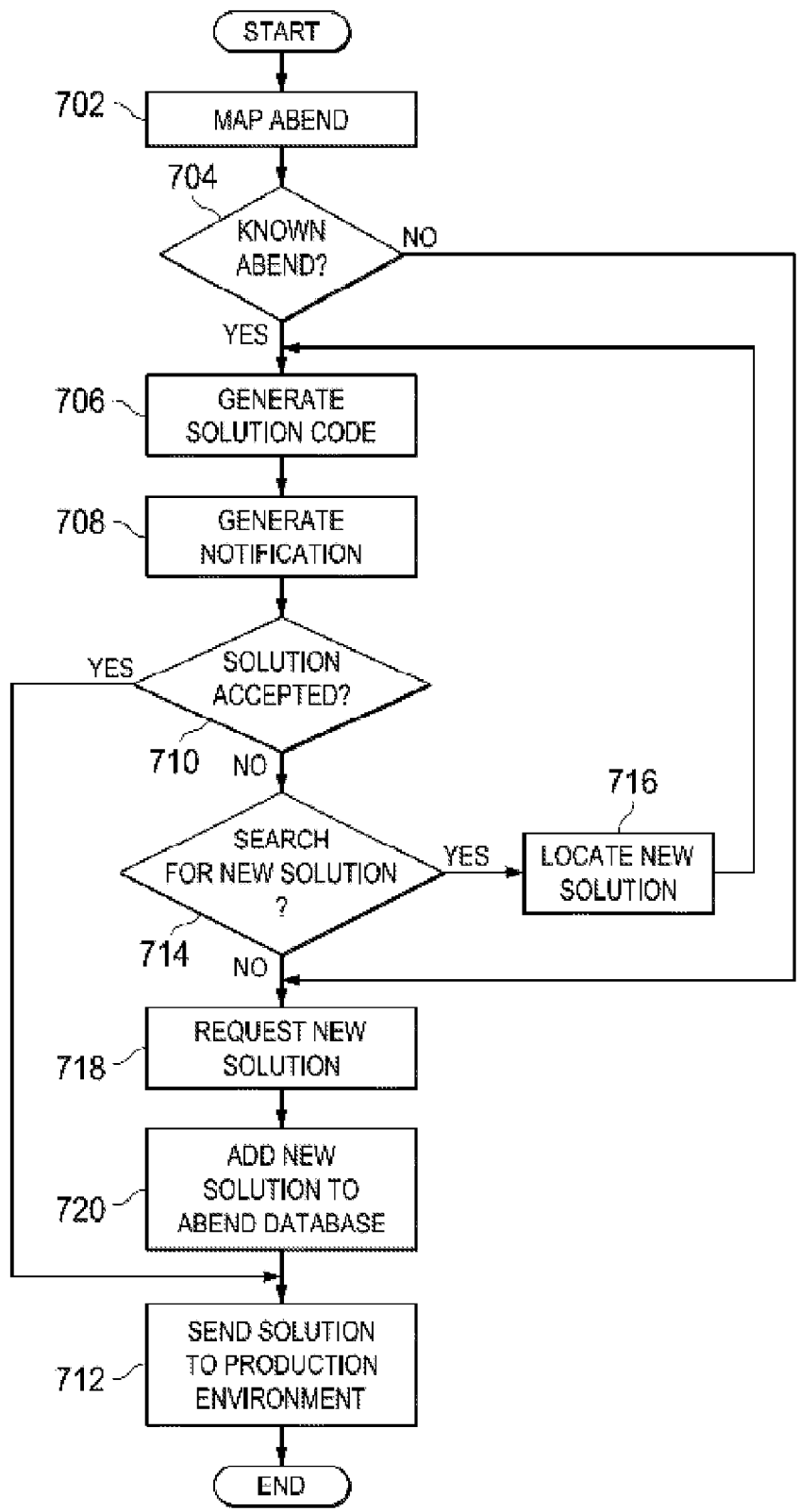
FIG. 7 is a flowchart of a process for performing an abend analysis in accordance with an illustrative embodiment.

FIG. 7 is a flowchart of a process for performing an abend analysis in accordance with an illustrative embodiment. The process depicted in FIG. 7 may be implemented by a software component, such as abend analysis module 330 in FIG. 3.

The process in FIG. 7 begins by mapping an abend (step 702). The abend is received from production data, such as production data 332 in FIG. 3. In this mapping phase, abends are grouped by jobs, systems, applications, and return code. The process then makes the determination as to whether the abend is a known abend (step 704). This determination is made by comparing the abend with known abends stored in an abend database.

If the process makes the determination that the abend is a known abend, then a solution code is generated (step 706). The solution code identifies one or more solutions for resolving the abend. Thereafter, a notification is generated (step 708). The notification may be presented to a user in an abend dashboard, such as abend dashboard 402 in FIG. 4. In one embodiment, the notification may be an abend notification such as abend error notification 406 in FIG. 4. In an alternate embodiment, the notification may include proposed abend solutions, such as proposed abend solution 408 in FIG. 4. In this manner, a user would be provided with notifications identifying the type of abend and a list of possible solutions.

A determination is then made as to whether the proposed solution has been accepted (step 710). If the process makes the determination that the proposed solution has been accepted, then the proposed solution is sent to the production environment for implementation (step 712) and the process terminates thereafter.

Returning to step 710, if the process makes the determination that the proposed solution was not accepted, then a determination is made as to whether a search for a new solution should be performed (step 714). If the process makes the determination that a search for a new solution should be performed, then the process locates a new solution (step 716) and proceeds to step 706. The new solution is located by searching abend database for additional solutions.

At step 714, if the process makes the determination that a search for a new solution should not be performed, then the process requests a new solution (step 718). The new solution is requested from an administrator or other user, such as user 338 in FIG. 3. The new solution is a new abend solution, such as new abend solution 340 in FIG. 3. After the new solution is generated and imported into the abend database, the process adds the new solution to the abend database (step 720).

Figure 8:
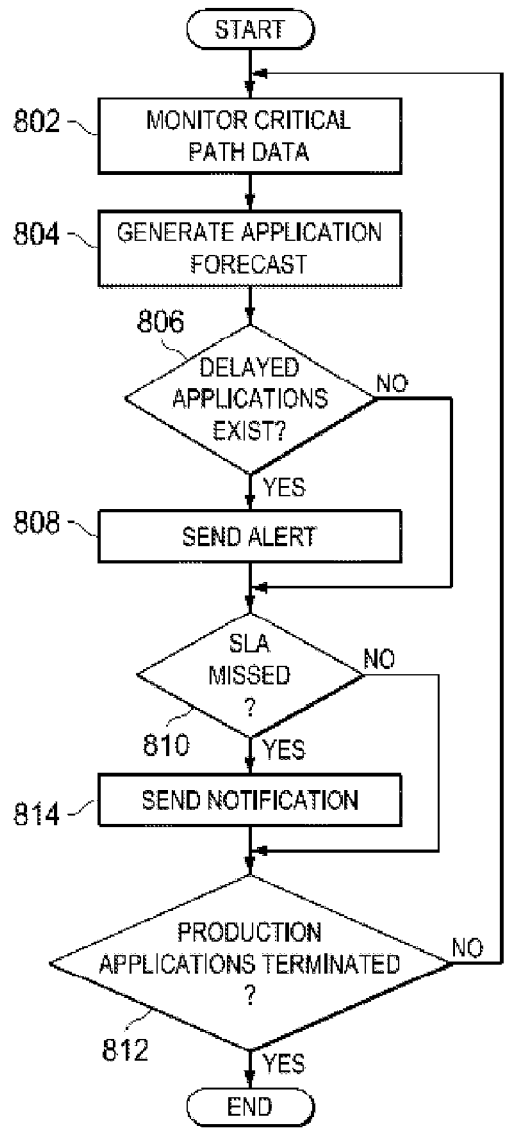
FIG. 8 is a flowchart of a process for performing a lighthouse analysis in accordance with an illustrative embodiment.

FIG. 8 is a flowchart of a process for performing a lighthouse analysis in accordance with an illustrative embodiment. The process depicted in FIG. 8 may be implemented by a software component such as a lighthouse analysis module 346 in FIG. 3.

The process begins by monitoring critical path data (step 802). The process then generates an application forecast (step 804). The application forecast is an application forecast such as application forecast 358 in FIG. 3. The application forecast identifies batch jobs in a critical path of a batch application and includes a sum of execution times for the batch jobs in the critical path. Using the application forecast, the process makes the determination as to whether delayed batch applications exist (step 806). If the determination is made that delayed batch applications exist, then the process sends an alert (step 808). In one embodiment, the alert may be presented to an administrator in a lighthouse dashboard. In other embodiments, the alert may be presented to any user via any existing or later developed communications system. For example, an alert may be sent in the form of a text message to a user's cellular telephone.

The process then makes a determination as to whether a service level agreement (SLA) has been missed (step 810). If the service level agreement (SLA) has not been missed, then the process makes another determination as to whether the batch production applications have terminated (step 812). If the determination is made that the batch production applications have terminated, then the process also terminates. However, if the process makes the determination that the batch production applications have not terminated, then the process returns to step 802.

Returning to step 806, if the process makes the determination that delayed batch applications do not exist, then the process continues to step 810.

At step 810, if the process makes the determination that the service level agreement (SLA) has been missed, then a notification is sent (step 814) and the process continues to step 812.

Thus, the illustrative embodiments described herein provide a computer implemented method, apparatus, and computer program product for managing a batch production system. In an illustrative embodiment, an application forecast is generated for a set of batch jobs in a critical path of a batch application. The application forecast comprises a sum of execution times for the batch jobs in the critical path. In response to detecting an abend from production data generated during the execution of the batch application, the abend is mapped against known abends in an abend database to identify a set of abend solutions. Thereafter, a notification is generated which comprises at least one of a status of the batch application and the set of abend solutions, wherein the status is generated based on the application forecast.

In this manner, the illustrative embodiments provide a method and apparatus for managing a batch production environment for achieving service level agreements. Achievement of service level agreements is facilitated by the timely resolution of abends, either manually or automatically. Furthermore, the method and apparatus disclosed herein provides for an intelligent software module for learning how to resolve newly discovered abends. Newly resolved abends may then be stored in an abend database for subsequent implementation in the event that the abend is detected again in the future.

In addition, a lighthouse analysis process disclosed herein provides an administrator with real-time data derived from the execution of critical path batch jobs of batch applications. The real-time data enables the administrator to determine which applications are running on schedule, which applications run the risk of infringing a service level agreement, and which applications have already infringed a related service level agreement. Administrators may use this information for quickly resolving errors or delays thereby enabling service providers to increase the likelihood of achieving service level agreement deadlines.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a batch production system, the computer implemented method comprising:
    determining a critical path of a batch application comprised of a plurality of batch jobs, wherein the critical path comprises a set of the batch jobs in the batch application that must be completed within a predefined minimum batch execution time window to ensure an on time execution of the batch application;
    associating the batch application with a service level agreement;
    generating an application forecast for the set of batch jobs in the critical path of the batch application, wherein the application forecast comprises a sum of execution times for the set of batch jobs in the critical path;
    responsive to detecting an abend from production data generated during an execution of the batch application, mapping the abend against known abends in an abend database to identify a set of abend solutions;
    generating a notification comprising a status of the batch application, a status of the service level agreement associated with the batch application, and the set of abend solutions, wherein the status of the batch application is generated based on the application forecast, wherein the generating the notification further comprises:
    receiving an average execution time for each batch job in the critical path;
    calculating the sum of execution times for the set of batch jobs in the critical path, wherein the sum of execution times comprises average execution times for incomplete batch jobs in the critical path and actual execution times for completed batch jobs in the critical path;
    wherein the status of the batch application is assigned based on the sum of execution times for the set of batch jobs in the critical path, wherein the status of the batch application indicates whether the batch application is on time, whether the batch application is at risk of being late, and whether the batch application is late;
    determining a completion percentage of the service level agreement based on at least the status of the batch application; and
    generating a service level agreement risk descriptor based on the determined completion percentage, the service level agreement risk descriptor indicating whether a batch execution window has been missed or whether one or more other terms of the service level agreement have been infringed;
    receiving client data for managing the batch application and for resolving problems encountered during the execution of the batch application, the client data including data associated with the identification of critical paths in the batch application and execution logs for the batch jobs in the critical paths;
    responsive to confirming that the client data is properly formatted, importing the client data to at least one of the abend database or a lighthouse database; and
    creating a new abend solution from the client data and storing the new abend solution in the abend database.

2. The computer implemented method of claim 1, further comprising:
    presenting the notification to a user in at least one of an abend dashboard and a lighthouse dashboard.

3. The computer implemented method of claim 1, further comprising:
responsive to an absence of an abend solution for the abend in the abend database, prompting the user for a new abend solution; and
storing the new abend solution in the abend database.

4. The computer implemented method of claim 1, further comprising:
sending an abend solution selected by the user to a production environment for implementation.

5. A computer program product stored on a non-transitory computer readable storage medium for managing a batch production system when executed by a computer system, the computer readable medium comprising program code for:
determining a critical path of a batch application comprised of a plurality of batch jobs, wherein the critical path comprises a set of the batch jobs in the batch application that must be completed within a predefined minimum batch execution time window to ensure an on time execution of the batch application;
associating the batch application with a service level agreement;
generating an application forecast for the set of batch jobs in the critical path of the batch application, wherein the application forecast comprises a sum of execution times for the set of batch jobs in the critical path;
mapping an abend against known abends in an abend database to identify a set of abend solutions in response to detecting the abend from production data generated during an execution of the batch application; and
generating a notification comprising a status of the batch application, a status of the service level agreement associated with the batch application, and the set of abend solutions, wherein the status of the batch application is generated based on the application forecast, wherein the generating the notification further comprises:
receiving an average execution time for each batch job in the critical path;
calculating the sum of execution times for the set of batch jobs in the critical path, wherein the sum of execution times comprises average execution times for incomplete batch jobs in the critical path and actual execution times for completed batch jobs in the critical path;
wherein the status of the batch application is assigned based on the sum of execution times for the set of batch jobs in the critical path, wherein the status of the batch application indicates whether the batch application is on time, whether the batch application is at risk of being late, and whether the batch application is late;
determining a completion percentage of the service level agreement based on at least the status of the batch application; and
generating a service level agreement risk descriptor based on the determined completion percentage, the service level agreement risk descriptor indicating whether a batch execution window has been missed or whether one or more other terms of the service level agreement have been infringed;
receiving client data for managing the batch application and for resolving problems encountered during the execution of the batch application, the client data including data associated with the identification of critical paths in the batch application and execution logs for the batch jobs in the critical paths;
responsive to confirming that the client data is properly formatted, importing the client data to at least one of the abend database or a lighthouse database; and
creating a new abend solution from the client data and storing the new abend solution in the abend database.

6. The computer program product of claim 5, further comprising program code for:
presenting the notification to a user in at least one of an abend dashboard and a lighthouse dashboard.

7. The computer program product of claim 5, further comprising program code for:
prompting the user for a new abend solution in response to an absence of an abend solution for the abend in the abend database; and
storing the new abend solution in the abend database.

8. The computer program product of claim 5, further comprising program code for:
sending an abend solution selected by the user to a production environment for implementation.

9. An apparatus for managing a batch production system, the apparatus comprising:
a bus system;
a memory connected to the bus system, wherein the memory includes computer usable program code; and
a processing unit connected to the bus system, wherein the processing unit executes the computer usable program code to:
determine a critical path of a batch application comprised of a plurality of batch jobs, wherein the critical path comprises a set of the batch jobs in the batch application that must be completed within a predefined minimum batch execution time window to ensure an on time execution of the batch application;
associate the batch application with a service level agreement;
generate an application forecast for the set of batch jobs in the critical path of the batch application, wherein the application forecast comprises a sum of execution times for the set of batch jobs in the critical path;
map an abend against known abends in an abend database to identify a set of abend solutions in response to detecting the abend from production data generated during an execution of the batch application; and
generate a notification comprising a status of the batch application, a status of the service level agreement associated with the batch application, and the set of abend solutions, wherein the status of the batch application is generated based on the application forecast, wherein the generating the notification further comprises:
receiving an average execution time for each batch job in the critical path;
calculating the sum of execution times for the set of batch jobs in the critical path, wherein the sum of execution times comprises average execution times for incomplete batch jobs in the critical path and actual execution times for completed batch jobs in the critical path;
wherein the status of the batch application is assigned based on the sum of execution times for the set of batch jobs in the critical path, wherein the status of the batch application indicates whether the batch application is on time, whether the batch application is at risk of being late, and whether the batch application is late;

determining a completion percentage of the service level agreement based on at least the status of the batch application; and generating a service level agreement risk descriptor based on the determined completion percentage, the service level agreement risk descriptor indicating whether a batch execution window has been missed or whether one or more other terms of the service level agreement have been infringed;

receiving client data for managing the batch application and for resolving problems encountered during the execution of the batch application, the client data including data associated with the identification of critical paths in the batch application and execution logs for the batch jobs in the critical paths;

responsive to confirming that the client data is properly formatted, importing the client data to at least one of the abend database or a lighthouse database; and creating a new abend solution from the client data and storing the new abend solution in the abend database.

10. The apparatus of claim 9, wherein the processing unit further executes the computer usable program code to:

prompt the user for a new abend solution in response to an absence of an abend solution for the abend in the abend database; and store the new abend solution in the abend database.

11. The apparatus of claim 9, wherein the processing unit further executes the computer usable program code to:

present the notification to a user in at least one of an abend dashboard and a lighthouse dashboard.

12. The apparatus of claim 9, wherein the processing unit further executes the computer usable program code to:

receive client data; and import the client data to at least one of an abend database and a lighthouse database in response to confirming that the client data is properly formatted.

13. The apparatus of claim 9, wherein the processing unit further executes the computer usable program code to:

send an abend solution selected by the user to a production environment for implementation.

14. A system for managing a batch production system, the system comprising:

at least one computer, including:

an abend analysis module, wherein the abend analysis module maps an abend against known abends in an abend database to identify a set of abend solutions in response to detecting the abend from production data generated during an execution of a batch application comprised of a plurality of batch jobs, and wherein the abend analysis module generates a first notification comprising the set of abend solutions; and a lighthouse analysis module, wherein the lighthouse analysis module:

identifies a critical path of the batch application, wherein the critical path comprises a set of the batch jobs in the batch application that must be completed within a predefined minimum batch execution time window to ensure an on time execution of the batch application;

associates the batch application with a service level agreement; and generates an application forecast for the set of batch jobs in the critical path of the batch application, wherein the application forecast comprises a sum of execution times for the set of batch jobs in the critical path, and wherein the lighthouse analysis module generates a second notification comprising a status of the batch application and a status of the service level agreement associated with the batch application, wherein the generating the second notification further comprises:

receiving an average execution time for each batch job in the critical path;

calculating the sum of execution times for the set of batch jobs in the critical path, wherein the sum of execution times comprises average execution times for incomplete batch jobs in the critical path and actual execution times for completed batch jobs in the critical path;

wherein the status of the batch application is assigned based on the sum of execution times for the set of batch jobs in the critical path, wherein the status of the batch application indicates whether the batch application is on time, whether the batch application is at risk of being late, and whether the batch application is late;

determining a completion percentage of the service level agreement based on at least the status of the batch application; and generating a service level agreement risk descriptor based on the determined completion percentage, the service level agreement risk descriptor indicating whether a batch execution window has been missed or whether one or more other terms of the service level agreement have been infringed;

receives client data for managing the batch application and for resolving problems encountered during the execution of the batch application, the client data including data associated with the identification of critical paths in the batch application and execution logs for the batch jobs in the critical paths;

responsive to confirmation that the client data is properly formatted, imports the client data to at least one of the abend database or a lighthouse database; and creates a new abend solution from the client data and stores the new abend solution in the abend database.

15. The system of claim 14, further comprising:

an abend dashboard, wherein the abend dashboard presents the first notification generated by the abend analysis module; and a lighthouse dashboard, wherein the lighthouse dashboard presents the second notification generated by the lighthouse analysis module.

16. The system of claim 14, further comprising:

an import module, wherein the import module receives client data, and wherein the import module imports the client data to at least one of an abend database and a lighthouse database in response to confirming that the client data is properly formatted.

17. The system of claim 14, wherein the abend analysis module further prompts the user for a new abend solution in response to an absence of an abend solution for the abend in the abend database; and stores the new abend solution in the abend database.

* * * * *